United States Patent

Inoue et al.

Patent Number: 5,256,480
Date of Patent: Oct. 26, 1993

[54] SILICONE RUBBER LAMINATE AND METHOD OF MAKING

[75] Inventors: Yoshio Inoue; Masaharu Takahashi, both of Annaka, Japan

[73] Assignee: Shin-Etsu Chemical Co., Ltd., Tokyo, Japan

[21] Appl. No.: 774,540

[22] Filed: Oct. 8, 1991

[30] Foreign Application Priority Data

Oct. 11, 1990 [JP] Japan .................. 2-270341

[51] Int. Cl.$^5$ ................................. B32B 9/04
[52] U.S. Cl. ................... 428/331; 428/408; 428/447
[58] Field of Search .......... 428/408, 331, 447; 528/15, 18, 31, 32, 33, 42, 43

[56] References Cited

U.S. PATENT DOCUMENTS 4,196,273  4/1980  Imai et al. ................. 528/15
4,842,943  6/1989  Kobayashi et al. ........ 428/447

FOREIGN PATENT DOCUMENTS 0095260  11/1983  European Pat. Off. .
0102650  3/1984   European Pat. Off. .
56-41417  9/1981  Japan .
61-34982  8/1986  Japan .
61-39188  9/1986  Japan .

Primary Examiner—Paul J. Thibodeau
Assistant Examiner—D. S. Nakarani
Attorney, Agent, or Firm—Birch, Stewart Kolasch & Birch

[57] ABSTRACT

A silicone rubber laminate including a conductive layer of cured silicone rubber containing carbon black and a dielectric layer of cured silicone rubber stacked and integrated to each other. The bonding force is enhanced by applying to the conductive layer a dielectric uncured silicone rubber composition comprising (a) an organopolysiloxane containing at least two alkenyl groups per molecule, (b) an organopolysiloxane containing at least two SiH groups per molecule, (c) reinforcing silica, (d) an organic silicon compound having an alkenyl group per molecule, and (e) a platinum catalyst, the molar ratio of the SiH group in component (b) to the total alkenyl group in components (a) and (d) ranging from 1:1 to 4:1, and curing the composition.

11 Claims, 1 Drawing Sheet

SILICONE RUBBER LAMINATE AND METHOD OF MAKING

This invention relates to a silicone rubber laminate and a method for preparing the same. More particularly, the present invention relates to a silicone rubber laminate comprising a conductive layer of cured silicone rubber containing carbon black and a dielectric layer of cured silicone rubber that has an improved bond between the layers.

BACKGROUND OF THE INVENTION

In the past, silicone rubber laminates comprising a conductive silicone rubber containing carbon black and a dielectric silicone rubber stacked thereon were widely used as electric contact material for electric and electronic parts, typically zebra connectors and contact rubber.

For the manufacture of these silicone rubber laminates comprising a conductive silicone rubber containing carbon black and a dielectric silicone rubber stacked thereon, a number of proposals have been made with respect to the compositions of conductive and dielectric silicone rubber layers as well as the laminate manufacturing method. For example, Japanese Patent Publication No. 41417/1981 discloses a method including curing a conductive carbon black-containing silicone rubber with organic peroxides to form a conductive cured silicone rubber layer, stacking a second uncured silicone rubber layer thereon, and curing the second layer with organic peroxides. Japanese Patent Publication No. 34982/1986 discloses an integrated silicone rubber article, and a method for making the same, including a cured mass of silicone rubber containing 5 to 75% by weight of carbon black and a cured mass of a carbon black-free silicone rubber composition. The carbon black-free silicone rubber predominantly comprises an organopolysiloxane having at least two alkenyl groups per molecule, an organohydrogenpolysiloxane, and a reinforcing silica filler. The molar ratio of the SiH group in the organohydrogenpolysiloxane to the alkenyl group in the organopolysiloxane being from 0.8/1 to 6/1, and the silicone rubber composition being addition reaction curable in the presence of a platinum series catalyst. Japanese Patent Publication No. 39188/1986 discloses an integrated silicone rubber article, and a method for its preparation, that includes a cured mass of conductive silicone rubber containing 5 to 75% by weight of carbon black, the conductive silicone rubber being addition reaction curable in the presence of a platinum series catalyst, and a cured mass of substantially carbon black-free silicone rubber which is vulcanizable with non-acyl organic peroxides.

However, since the cured mass of conductive silicone rubber containing carbon black is covered with an uncured dielectric silicone rubber layer followed by curing, these silicone rubber laminates are weak in bond strength between the silicone rubber layers and less satisfactory in long term storage.

Often, these laminates are used as electric contact material in electronic devices. Few problems arise with respect to the bond between the conductive and dielectric silicone rubber layers if the electronic devices are used in an air conditioned environment. In the current days when electronic devices are used in any working environment, a problem can arise with respect to the bond between the conductive and dielectric silicone rubber layers, particularly in a hot humid environment. Therefore, there is a need to improve the bond between conductive and dielectric silicone rubber layers of a laminate such that the laminate may be fully reliable as an electric contact material as found in zebra connectors.

SUMMARY OF THE INVENTION

Therefore, an object of the present invention is to provide an improved silicone rubber laminate comprising conductive and dielectric silicone rubber layers exhibiting enhanced bond between the layers. Another object of the present invention is to provide a method for preparing such an improved silicone rubber laminate.

The inventors have discovered that by forming a dielectric silicone rubber layer to be stacked on a conductive layer of cured carbon black-containing silicone rubber from a cured product of a dielectric silicone rubber composition comprising (a) an organopolysiloxane of the general formula:

$$R_a SiO_{(4-a)/2} \qquad (1)$$

wherein R is a hydroxyl group or a substituted or unsubstituted monovalent hydrocarbon group, 0.0001 to 0.5 mol % of R being an alkenyl group, and letter a is a number of 1.95 to 2.05, having a degree of polymerization of at least 200 and containing at least two alkenyl groups per molecule, (b) an organopolysiloxane containing at least two SiH groups per molecule, (c) reinforcing silica, (d) an organic silicon compound having an alkenyl group per molecule, and (e) a platinum catalyst, the molar ratio of the SiH group in components (b) to the total alkenyl group in components (a) and (d) ranging from 1:1 to 4:1, there is obtained a silicone rubber laminate in which conductive and dielectric silicone rubber layers are strongly bonded and closely integrated to each other. The dielectric cured silicone rubber layer can be readily formed by stacking a dielectric uncured silicone rubber composition on a conductive mass of cured silicone rubber containing carbon black, and curing the composition, thereby forming a dielectric layer of cured silicone rubber on the conductive mass of cured silicone rubber. There is obtained a silicone rubber laminate in which the bond between the conductive and dielectric silicone rubber layers is improved such that no separation can occur therebetween even under high temperature/high humidity service conditions.

Consequently, the present invention provides a silicone rubber laminate comprising at least one conductive layer of cured silicone rubber containing carbon black and at least one dielectric layer of cured silicone rubber stacked and integrated to each other, the dielectric layer being formed of a dielectric silicone rubber composition in cured form comprising components (a) to (e) as defined above.

Also contemplated herein is a method for preparing a silicone rubber laminate comprising the steps of stacking a dielectric silicone rubber composition comprising components (a) to (e) as defined above on a conductive mass of cured silicone rubber containing carbon black, and curing the composition, thereby forming a dielectric layer of cured silicone rubber on the conductive mass of cured silicone rubber.

BRIEF DESCRIPTION OF THE DRAWING

The only FIGURE is a perspective view illustrating a 180° peeling test on a silicone rubber laminate.

DETAILED DESCRIPTION OF THE INVENTION

Figure 1:
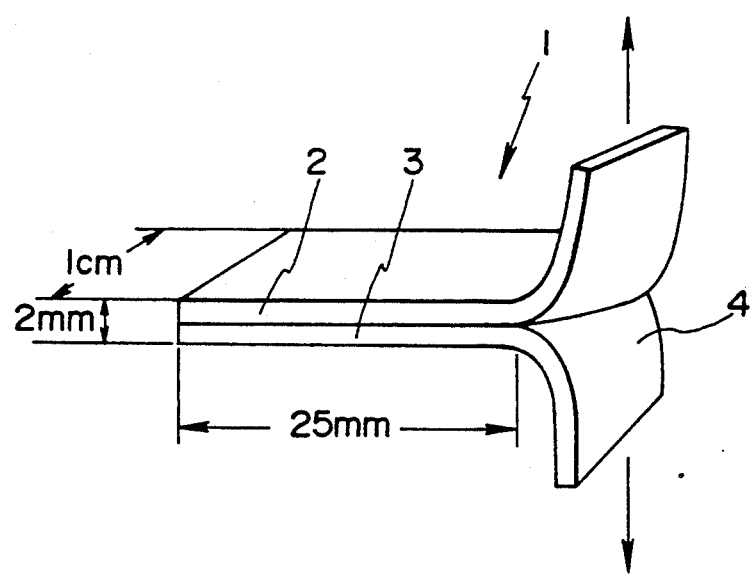

As defined above, the silicone rubber laminate according to the present invention includes a conductive layer of cured silicone rubber containing carbon black and a dielectric layer of cured silicone rubber stacked one on another and integrated to each other. The bond between the conductive and dielectric cured silicone rubber layers is significantly enhanced by forming the dielectric cured silicone rubber layer from a cured product of a specific silicone rubber composition.

The dielectric silicone rubber composition is defined herein as comprising the following components:

(a) an organopolysiloxane of formula (1):

$$R_aSiO_{(4-a)/2} \quad (1)$$

wherein R is a hydroxyl group or a substituted or unsubstituted monovalent hydrocarbon group, 0.0001 to 0.5 mol % of the entire R groups being an alkenyl group, and letter a is a number of 1.95 to 2.05, having a degree of polymerization of at least 200 and containing at least two alkenyl groups per molecule, (b) an organopolysiloxane containing at least two SiH groups per molecule, (c) reinforcing silica, (d) an organic silicon compound having an alkenyl group per molecule, and (e) a platinum catalyst, the molar ratio of the SiH group in component (b) to the total alkenyl group in components (a) and (d) ranging from 1:1 to 4:1.

The components are described in detail. Component (a) is an organopolysiloxane of formula (1) in liquid or raw rubber state.

$$R_aSiO_{(4-a)/2} \quad (1)$$

In formula (1), R is a hydroxyl group or a substituted or unsubstituted monovalent hydrocarbon group, 0.0001 to 0.5 mol %, preferably 0.01 to 0.3 mol % of the entire R groups being an alkenyl group while there are contained at least two alkenyl groups per molecule. The alkenyl group has 2 to 10, preferably 2 to 6 carbon atoms and includes vinyl group and allyl group. Organopolysiloxanes are less curable with an alkenyl content of less than 0.0001 mol % of R whereas cure products show poor properties with an alkenyl content of more than 0.5 mol % of R. R groups other than alkenyl have 1 to 10, preferably 1 to 6 carbon atoms and include alkyl groups such as methyl, ethyl, propyl, butyl, pentyl, hexyl, octyl, decyl and dodecyl groups; aryl groups such as phenyl and tolyl groups; aralykyl groups such as β-phenylethyl group; and substituted ones of these hydrocarbon groups in which some or all of the hydrogen atoms attached to carbon atoms are replaced by halogen atoms such as fluorine and cyano groups, for example, 3,3,3-trifluoropropyl and cyanoethyl groups. Most often, R groups other than alkenyl are methyl groups. Where low-temperature resistance, radiation resistance and transparency are required, the R groups preferably contain at most 20 mol %, especially 3 to 10 mol % of phenyl group. Where resistance against oil and gasoline is required, the R groups preferably contain 30 to 99 mol % of cyanoethyl or 3,3,3-trifluoropropyl group.

In formula (1), letter a is a number having a value of 1.95 to 2.05, preferably 1.98 to 2.02. The organopolysiloxane of formula (1) has a degree of polymerization of at least 200, preferably from 200 to 10,000, more preferably from 300 to 10,000.

The organopolysiloxane as component (a) consists essentially of diorganopolysiloxane units, but minor proportions of triorganosiloxane, monoorganosiloxane, and $SiO_2$ units may be contained and the molecular chain may be end-blocked with hydroxyl groups or triorganosiloxy units.

Component (b) is an organopolysiloxane containing at least two SiH groups per molecule, which may be linear, cyclic or branched. The SiH groups may be at an end or intermediate of the polysiloxane chain. The organohydrogenpolysiloxanes used as the crosslinking agent preferably have the following formula.

$$H_bR^1_cSiO_{(4-b-c)/2}$$

In the formula, $R^1$s are the same or different substituted or unsubstituted monovalent hydrocarbon groups, excluding aliphatic unsaturated groups, preferably having 1 to 10 carbon atoms, for example, alkyl groups such as methyl, ethyl, propyl and butyl groups, aryl groups such as phenyl and tolyl groups, aralkyl groups such as benzyl and β-phenylethyl groups, and cycloalkyl groups such as cyclohexyl groups, b is a positive number of from 0.002 to 1.0, c is a positive number of from 1.99 to 2.02, and the sum of b+c is in the range of from 1.992 to 3.0. The organopolysiloxane generally has a viscosity of 10 to 1,000 centistokes (cs), preferably 30 to 200 cs, although the viscosity is not critical.

Component (c) is reinforcing silica which preferably has a specific surface area of at least 50 m²/g, preferably 50 to 400 m²/g, more preferably 100 to 400 m²/g in BET method for the purpose of imparting appropriate hardness to the silicone rubber and improving tensile strength and other mechanical properties.

Examples of silica include fumed silica, calcined silica, and precipitated silica alone and in admixture. The silica may be surface treated with linear organopolysiloxanes, cyclic organopolysiloxanes, hexamethyldisilazane or the like.

Component (d) is an organic silicon compound which is effective for establishing, after a dielectric silicone rubber layer in uncured form is closely applied and cured to a conductive cured silicone rubber layer, a firm bond between the silicone rubber layers. This organic silicon compound should have one alkenyl group such as a vinyl or allyl group per molecule. Exemplary organic silicon compounds are vinyltrimethoxysilane, vinylmethyldimethoxysilane, vinyldimethylmonomethoxysilane, allytrimethoxysilane, allylmethyldimethoxysilane, substituted silanes in which some or all or the methoxy groups of these silanes are replaced by alkoxy group such as ethoxy and methoxyethoxy groups, and vinyl-containing siloxanes as given below.

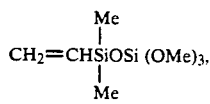

-continued

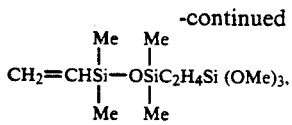

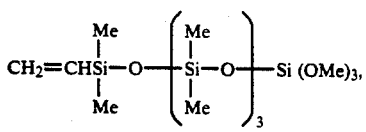

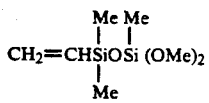

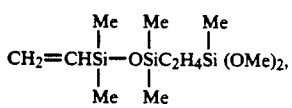

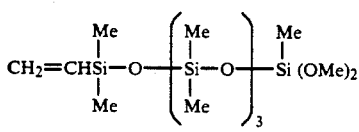

In the foregoing formulae, Me is methyl.

Component (e) is a platinum catalyst which catalyzes the hydrosilylation reaction between the alkenyl group in the organopolysiloxane or component (a) and the alkenyl group in the organic silicon compound or component (d) and the SiH group in the organopolysiloxane or component (b).

Suitable platinum group metal catalysts are powder metallic platinum catalysts as disclosed in U.S. Pat. No. 2,970,150 (Bailey), chloroplatinic acid catalysts as disclosed in U.S. Pat. No. 2,823,218 (Speier et al.), platinum-hydrocarbon complexes as disclosed in U.S. Pat. Nos. 3,159,601 (Ashby) and 3,159,662, chloroplatinic acid-olefin complexes as disclosed in U.S. Pat. No. 3,516,949, platinum-vinyl siloxane complexes as disclosed in U.S. Pat. Nos. 3,775,452 (Karstedt) and 3,814,780, and the like.

Components (a), (b), and (d) are blended such that the molar ratio of the SiH group in component (b) to the total alkenyl group in components (a) and (d) ranges from 1:1 to 4:1, preferably from 1:1 to 3:1. More preferably, the molar ratio of the SiH group in component (b) to the total alkenyl group in components (a) and (d) ranges from 1:1 to 4:1, and at the same time, the molar ratio of the SiH group in component (b) to the alkenyl group in component (a) ranges from 6:1 to 20:1.

Generally, in conventional addition reaction curable type silicone rubbers comprising an organopolysiloxane having at least two SiH groups in its molecule and an organopolysiloxane having at least two alkenyl groups in its molecule, the molar ratio of the SiH group in the former organopolysiloxane to the alkenyl group in the latter organopolysiloxane ranges from 0.5:1 to 3:1, often 0.8:1 to 2:1 for practical applications. In contrast, the dielectric silicone rubber composition used in the present invention contains an organic silicon compound having one alkenyl group in its molecule as component (d) for improving adhesion to the conductive silicone rubber layer. Adhesion would be less improved with lower contents of the organic silicon compound (d) whereas higher contents of the organic silicon compound (d) would adversely affect the elongation and strength of silicone rubber. For this reason, the proportion of components (a), (b), and (d) is limited as above.

The proportions of components (c) and (e) blended are not particularly limited, although component (c) or reinforcing silica is generally blended in amounts of 5 to 70 parts by weight, preferably 10 to 50 parts by weight per 100 parts by weight of component (a). Component (e) or platinum catalyst is generally blended in amounts of 0.1 to 1,000 ppm, preferably 1 to 100 ppm based on the weight of components (a) and (b) combined.

The dielectric cured silicone rubber layer of the silicone rubber laminate according to the invention is obtained by heating a silicone rubber composition comprising components (a) to (e) as defined above at a temperature of about 60° C. to about 200° C. for about 0.5 to about 5 hours for curing. Any desired agent may be added to the silicone rubber composition for controlling curing reaction. To addition reaction curing type of silicone rubber compositions, such reaction controlling agents as methylvinylcyclotetrasiloxane and acetylene alcohol may be added since the compositions become stable during storage at room temperature and have an appropriate pot life.

On the other hand, the conductive cured silicone rubber layer consists essentially of a silicone rubber base compound having carbon black added for imparting electric conductivity, for example, a conductivity of up to 10 Ω/cm, especially up to 3 Ω/cm. The silicone rubber base compound of which the conductive cured silicone rubber layer is formed may be of any desired curing types including organic peroxide curing, addition reaction curing, and room temperature curing types, with the addition reaction curing type being preferred.

The silicone rubber base compounds of the addition reaction curing type may be the same as described for the dielectric silicone rubber composition although such dielectric silicone rubber compositions comprising components (a), (b), (c) and (e) as previously defined are often used. Preferably, component (b) or organopolysiloxane containing at least two SiH groups per molecule is used to provide 0.5 to 3 mol, especially 1 to 2 mol of SiH group per mol of the alkenyl group in component (a) or organopolysiloxane containing at least two alkenyl groups per molecule.

The silicone rubber base compounds of the organic peroxide curing type preferably contain 100 parts by weight of an organopolysiloxane of the general formula:

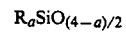

wherein R and a are as defined above, in liquid or raw rubber state, containing at least two alkenyl groups per molecule, 0.01 to 3 parts by weight, especially 0.05 to 1 parts by weight of an organic peroxide, and if desired, a filler and other optional components. The organic peroxide used herein may be selected from those commonly used for curing carbon black-containing silicone rubbers of the peroxide curing type, for example, benzoyl peroxide, bis(2,4-dichlorobenzoyl) peroxide, di-t-butyl peroxide, 2,5-dimethyl-di-t-butylperoxyhexane, t-butylperbenzoate, t-butylperoxyisopropyl carbonate, dicumyl peroxide, etc. alone or in admixture of two or more. These silicone rubbers of the organic peroxide curing type can be readily cured by heating at a temperature of about 100° to about 250° C. for about 5 minutes to about 5 hours.

The carbon black which can be blended in the above-mentioned silicone rubber base compounds may be selected from acetylene black, furnace black, channel black, and thermal black. Among others, acetylene black and furnace black are preferred for use of the laminate as electric contact material. The amount of carbon black blended is not particularly limited although it preferably ranges from 5 to 70% by weight, especially from 10 to 50% by weight of the silicone rubber base compound.

A cured layer of conductive silicone rubber may be formed by any conventional methods, for example, compression molding, extrusion molding, injection molding, and transfer molding.

It is to be noted that both the silicone rubber compositions of which the dielectric and conductive cured silicone rubber layers are formed may contain, if desired, a reinforcing or extending filler in addition to the above-mentioned components insofar as the desired properties are not detrimentally affected. The fillers may be well-known ones, for example, diatomaceous earth, metal oxides such as iron oxide, zinc oxide and titanium oxide optionally surface treated with silane and similar agents, metal carbonates such as calcium carbonate, magnesium carbonate, and zinc carbonate, asbestos, glass fibers, ground mica, fused silica powder, etc. Further, the compositions may contain thixotropic agents (e.g., polyethylene glycol and derivatives thereof), pigments, dyes, antioxidants, antistatic agents, flame retardants (e.g., antimony oxide and chlorinated paraffin), and heat transfer modifiers (e.g., boron nitride and aluminum oxide), if desired. Also useful are other well-known additives, for example, bond improving agents, e.g., organic silicon compounds having a reactive organic group such as amino, epoxy and mercapto groups, silane coupling agents, plasticizers, anti-sagging agents, stain-proof agents, preservatives, fungicidal agents, and bactericidal agents.

The silicone rubber laminate of the invention is a stack of conductive and dielectric silicone rubber layers as previously defined. The silicone rubber layers can be stacked and integrated by first forming a conductive cured silicone rubber layer, applying a dielectric silicone rubber composition containing components (a) to (e) as previously defined to the conductive layer by a suitable technique, for example, compression molding, extrusion molding, injection molding, and transfer molding, and heat curing the composition to the underlying conductive layer. This simple procedure ensures that the conductive and dielectric silicone rubber layers are firmly and integrally bonded to provide a silicone rubber laminate. The remaining conditions in forming the dielectric cured silicone rubber layer are as conventionally used for this type of rubber.

The silicone rubber laminate of the present invention may take any desired shapes including plate-shaped laminates having a conductive silicone rubber sheet(s) and a dielectric silicone rubber sheet(s) stacked one on another, and rod-shaped laminates having a conductive cured silicone rubber cylinder covered on the outer surface with a dielectric cured silicone rubber layer. Other shapes may be employed in accordance with the intended applications. The number of conductive and dielectric cured silicon rubber layers is not limited to one for each layer, but two or more strata may be used for either one or both of the conductive and dielectric layers.

There has been described a silicone rubber laminate in which a conductive layer of cured silicone rubber containing carbon black is firmly bonded to a dielectric layer of cured silicone rubber with enough reliability to use as contact material in electric and electronic parts such as zebra connectors and contact rubber. The method of the invention provides for easy and consistent manufacture of such a silicone rubber laminate.

EXAMPLE

Examples of the present invention are given below by way of illustration and not by way of limitation. All parts and percents are by weight.

EXAMPLES 1-4 AND COMPARATIVE EXAMPLES 1-4

Conductive silicone rubber sheets were prepared from a conductive silicone rubber composition KE380-1MU commercially available from Shin-Etsu Chemical Co., Ltd. which contained 100 parts by weight of silicone rubber polymer and 65 parts by weight of carbon black by adding 2.0 parts of an addition type curing catalyst C-19A and 2.5 parts of an addition type curing catalyst C-19B, both commercially available from Shin-Etsu Chemical Co., Ltd. to 100 parts of the rubber composition. After homogeneous blending, the composition was press molded under a pressure of 35 kg/cm$^2$G at 165° C. for 10 minutes into conductive silicone rubber sheets of 10 cm × 10 cm × 1 mm (thick). The conductivity of the sheet had a conductivity of 3.5 Ω.cm.

Separately, four dielectric silicone rubber compositions were prepared. First, a base compound was prepared by charging a kneader with 100 parts of methylvinylpolysiloxane raw rubber consisting essentially of 99.76 mol % of (CH$_3$)$_2$SiO unit and 0.215 mol % of (CH$_3$)(CH$_2$=CH)SiO unit, end-blocked with 0.025 mol % of (CH$_2$=CH)(CH$_3$)SiO$_{\frac{1}{2}}$ unit, and having a degree of polymerization of about 8,000 as component (a). Then 45 parts of precipitated silica Nipsil Lp commercially available from Nihon Silica K.K. and 5 parts of dimethylpolysiloxane blocked with a hydroxyl group at either end (degree of polymerization about 10) were added. The mixture was uniformly milled and then heated at 170° C. for 2 hours, obtaining the base compound. To 100 parts of the base compound were added vinyltrimethoxysilane or ViMe$_2$SiOsi(OMe)$_3$ wherein Vi is vinyl and Me is methyl as component (d), a platinum compound in the form of a 2-ethylhexanol solution of chloroplatinic acid (Pt 2%) as component (e), acetylene alcohol as a reaction controlling agent, and an organopolysiloxane crosslinking agent containing 50 mole % of

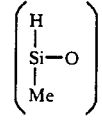

unit and the remainder of

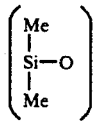

unit, and having a degree of polymerization of 150 as component (b) in the amounts reported in Table 1. The mixtures were uniformly milled in a twin roll mill, obtaining the four dielectric silicone rubber compositions within the scope of the invention. Similarly, four dielectric silicone rubber compositions outside the scope of the invention were prepared by omitting component (d).

Next, each conductive silicon rubber sheet was placed in a mold cavity of 10 cm × 10 cm × 2 mm (thick) and each of the dielectric silicone rubber compositions was press molded on the sheet under a pressure of 35 kg/cm²G at 165° C. for 10 minutes. In this way, eight silicone rubber laminates were prepared. During the process, a Teflon sheet of 0.5 mm thick was partially interposed between the stacked rubber layers to create a non-bonded area therebetween.

The silicone rubber laminates were measured for hardness, tensile strength, and elongation and visually observed on the outer appearance for the presence of bubbles. The results are shown in Table 1.

A 180° peeling test was carried out on each of the silicone rubber laminates by cutting it into a strip of 1 cm wide, allowing it to stand for 96 hours in an environment at 50° C. and relative humidity 90%, pulling apart the silicone rubber layers at the non-bonded area at a rate of 50 mm/min. in 180° opposite directions as shown in the figure. The bonding force between the silicone rubber layers was measured and it was observed whether the layers separated in cohesive failure or interfacial separation mode. The results are also shown in Table 1.

It will be understood that a silicone rubber laminate 1 is illustrated in the figure as including a dielectric cured silicone rubber layer 2 and a conductive cured silicone rubber layer 3 bonded to each other except a non-bonded area 4.

As is evident from Table 1, the silicone rubber laminates of the present invention exhibit a substantially enhanced bonding force between the conductive and dielectric silicone rubber layers.

Although some preferred embodiments have been described, many modifications and variations may be made thereto in the light of the above teachings. It is therefore to be understood that within the scope of the appended claims, the invention may be practiced otherwise than as specifically described.

TABLE 1

| | | Example | | | | Comparative Example | | | |
|---|---|---|---|---|---|---|---|---|---|
| | | 1 | 2 | 3 | 4 | 1 | 2 | 3 | 4 |
| Dielectric silicone rubber composition (pbw) | Base compound | 100 | 100 | 100 | 100 | 100 | 100 | 100 | 100 |
| | Vinyltrimethoxysilane, component (d) | 1 | 1.6 | 0 | 0.5 | 0 | 0 | 0 | 0 |
| | ViMe$_2$SiOSi(OMe)$_3$, component (d) | 0 | 0 | 1.5 | 0 | 0 | 0 | 0 | 0 |
| | Platinum compound, component (e) | 0.01 | 0.01 | 0.01 | 0.01 | 0.01 | 0.01 | 0.01 | 0.01 |
| | Control agent | 0.4 | 0.4 | 0.4 | 0.4 | 0.4 | 0.4 | 0.4 | 0.4 |
| | Crosslinking agent, component (b) | 1.6 | 3.1 | 1.6 | 2.3 | 0.49 | 1.2 | 3.1 | 0.15 |
| | SiH in (b)/total SiVi | 1.5 | 1.99 | 1.5 | 3.5 | 1.9 | 4.6 | 11.9 | 0.58 |
| | SiH in (b)/SiVi in (a) | 6.2 | 11.9 | 6.2 | 8.9 | 1.9 | 4.6 | 11.9 | 0.58 |
| Hardness (JIS-A) | | 64 | 69 | 64 | 67 | 65 | 70 | 75 | 25 |
| Tensile strength (V · gf/cm²) | | 60 | 76 | 62 | 70 | 57 | 63 | 74 | 30 |
| Elongation (%) | | 160 | 165 | 160 | 180 | 280 | 170 | 155 | 950 |
| Outer appearance (bubble) | | No | No | No | No | No | Bubbles in dielectric layer | Bubbles in dielectric layer | No |
| Bonding force (kgf/cm) | | 1.15 (cohesive failure) | 1.50 (cohesive failure) | 1.20 (cohesive failure) | 1.40 (cohesive failure) | 0.40 (interfacial separation) | 0.60 (60% interfacial separation) | 0.70 (50% interfacial separation) | 0.30 (interfacial separation) |

We claim:

1. A silicone rubber laminate comprising a conductive layer of cured silicone rubber containing carbon black and a dielectric layer of cured silicone rubber stacked and laminated to each other, said dielectric layer comprising the cured product of a silicone rubber composition comprising:
   (a) an organopolysiloxane of the general formula:

$$R_a SiO_{(4-a)/2} \quad (1)$$

wherein R is a hydroxyl group or a substituted or unsubstituted monovalent hydrocarbon group, 0.0001 to 0.5 mol % of R being an alkenyl group, and letter a is a number of 1.95 to 2.05, having a degree of polymerization of at least 200 and containing at least two alkenyl groups per molecule,
   (b) an organopolysiloxane containing at least two SiH groups per molecule,
   (c) reinforcing silica,
   (d) an organic silicon compound having an alkenyl group per molecule, and
   (e) a platinum catalyst,
   the molar ratio of the SiH group in component (b) to the total alkenyl group in components (a) and (d) ranging from 1:1 to 4:1, and wherein the molar ratio of the SiH group in component (b) to the alkenyl group in component (a) ranges from 6:1 to 20:1.

2. The silicone rubber laminate according to claim 1, wherein 0.01 to 0.3 mol % of R is an alkenyl group.

3. The silicone rubber laminate according to claim 1, wherein each molecule of said organopolysiloxane compound of formula (1) contains 2 to 10 alkenyl groups.

4. The silicone rubber laminate according to claim 3, wherein each molecule of said organopolysiloxane compound of formula (1) contains 2 to 6 alkenyl groups.

5. The silicone rubber laminate according to claim 1, wherein up to 20 mol % of said R groups represent a phenyl group.

6. The silicone rubber laminate according to claim 5, wherein 3 to 10 mol % of said R groups represent a phenyl group.

7. The silicone rubber laminate according to claim 1, wherein 30 to 99 mol % of said R groups represent a cyanoethyl or 3,3,3-trifluoropropyl group.

8. The silicone rubber laminate according to claim 1, wherein said organopolysiloxane of formula (1) has a degree of polymerization of 300 to 10,000.

9. The silicone rubber laminate according to claim 1, wherein said reinforcing silica is contained in an amount of 5 to 70 parts by weight per 100 parts by weight of component (a).

10. The silicone rubber laminate according to claim 9, wherein said reinforcing silica is contained in an amount of 10 to 50 parts by weight per 100 parts by weight of component (a).

11. The silicone rubber laminate according to claim 1, wherein said organic silicon compound of component (d) is either a silane selected from the group consisting of vinyltrimethoxysilane, vinylmethyldimethoxysilane, vinyldimethylmonomethoxysilane, allylmethyldimethoxysilane, and derivatives thereof which have one or more of said methoxy moieties replaced by an alkoxy group, or a siloxane selected from the group consisting of:

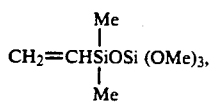

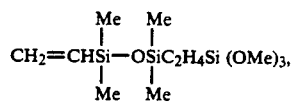

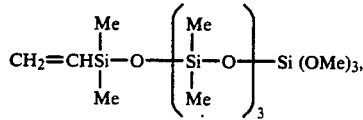

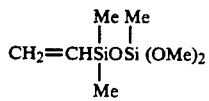

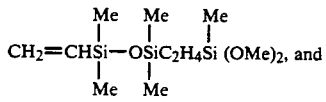

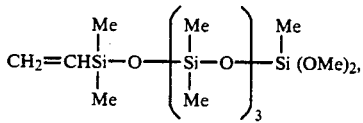

wherein Me is a methyl group.

* * * * *